Aug. 16, 1927.
F. A. GROVES ET AL
1,639,341
GASOLINE GAUGE
Filed Feb. 11, 1924    2 Sheets-Sheet 2
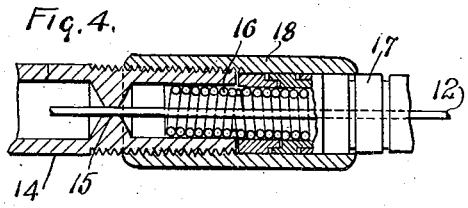
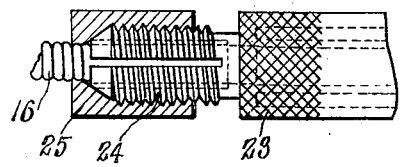
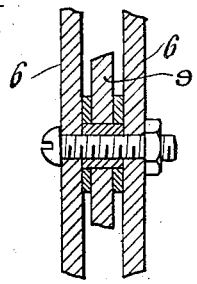
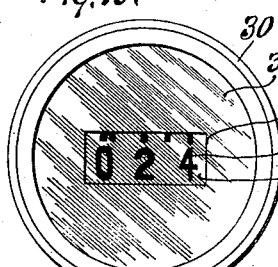
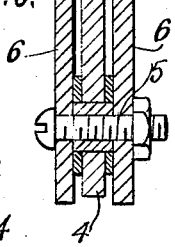
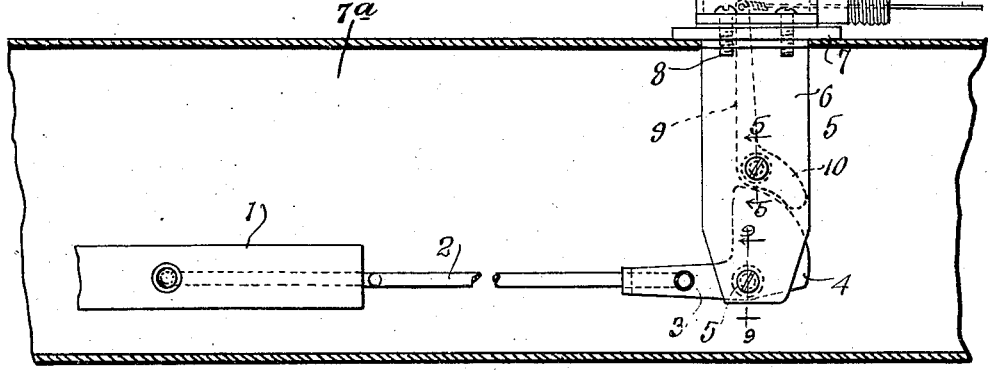
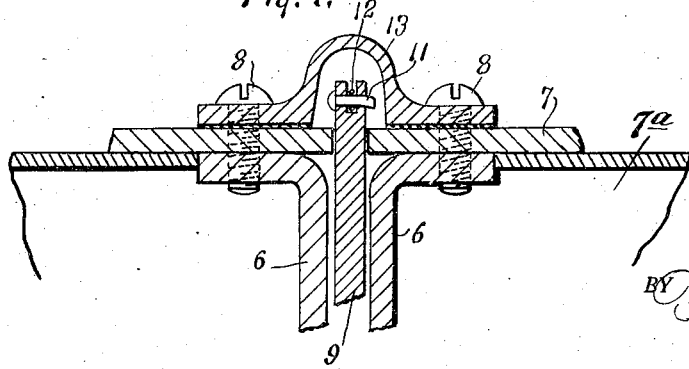
INVENTORS
FRANK A. GROVES,
JOHN F. GROVES,
BY
ATTORNEYS.

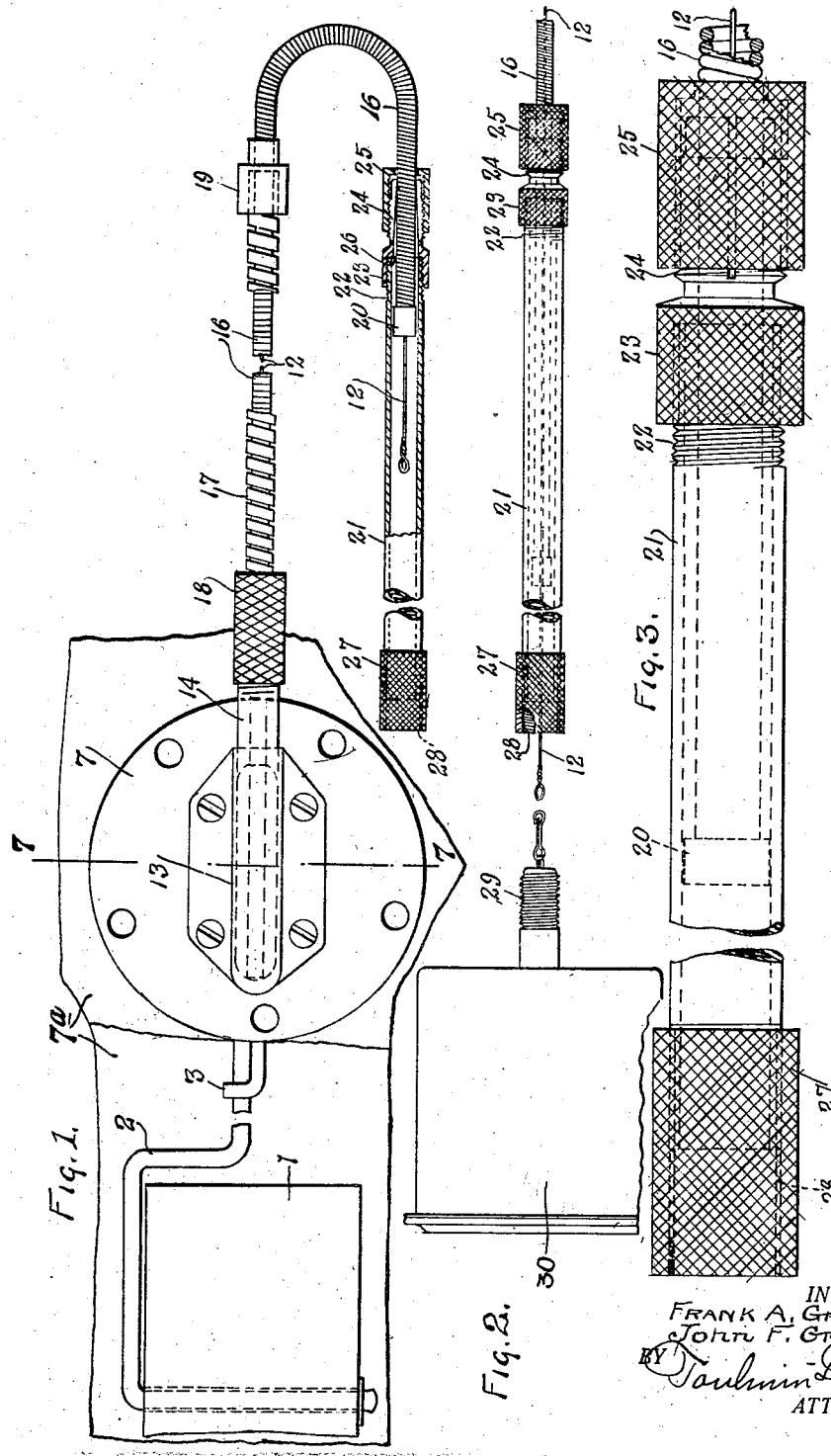

Patented Aug. 16, 1927.

1,639,341

UNITED STATES PATENT OFFICE.

FRANK A. GROVES AND JOHN FREDERICK GROVES, OF DAYTON, OHIO, ASSIGNORS TO THE GROLAN MANUFACTURING COMPANY, OF DAYTON, OHIO, A CORPORATION OF DELAWARE.

GASOLINE GAUGE.

Application filed February 11, 1924. Serial No. 691,883.

Our invention relates to gasoline gauges and in particular to mechanism for protecting the communicating means in such a gauge.

It is the object of our invention to provide a gasoline gauge, in which the fine wire which is used to communicate the motion of the float in the tank to the indicator on the dash-board may be protected in its entirety.

It is a further object to so arrange the mechanism that if the portion of the wire which projects beyond the end of the guide casing of the protecting housing does become injured, it will not prevent the perfect operation of the gauge.

It is a further object of our invention to provide a housing in the nature of a connecting guide tube or coupling, which cannot become detached from the flexible housing around the wire, which coupling will be susceptible of being adjusted with respect to the protecting housing, wire, and indicator casing.

It is also our object to provide a relatively close fitting flexible casing for the wire and a coupling head or tube, which is strong and stiff enough to prevent injury to the wire, and which is materially larger in diameter and internal clearance with respect to the wire than the flexible guide casing. Consequently, it is our object to have a relatively large housing adjacent that portion of the wire which may project from the guide casing when it is detached from the indicator, so that any kinks, or bends, or loops in such wire will not affect the free movement of it within its casing, because of the fact that such portion which may become so damaged always travels in the housing or coupling which is of diameter large enough that the modifications in the wire due to injury will not affect its free operation in the connecting guide tube, which would not have been the case, if such wire had to travel within the relatively close fitting, flexible guiding and protecting housing which surrounds the major portion of the wire.

Referring to the drawings:

Figure 1 is a plan view of the gauge equipment without the indicator head, with the connecting tube partially in section.

Figure 2 is a side elevation of the connecting tube and the detached indicator head with a portion of the communicating wire projecting.

Figure 3 is an enlarged view of the connecting guide tube and its method of attachment to the flexible tubing.

Figure 4 is a section of the connections of the flexible tubing to the tank unit and shows the arrangement whereby the gas is prevented from escaping into the flexible tube.

Figure 5 is a section on line 5—5 of Figure 6.

Figure 6 is a side elevation of the tank unit.

Figure 7 is a section on the line 7—7 of Figure 1.

Figure 8 is a view partially in section, of the connection between the flexible tubing and the connecting guide tube.

Figure 9 is a section on the line 9—9 of Figure 6.

Figure 10 is a front elevation of the indicator head.

Referring to the drawings in detail:

1 is the float mounted upon the float arm 2, which in turn is connected to a cam arm 3 carrying a cam 4. This arm 3 is pivoted at 5 to the depending brackets numbered 6, which are supported from a tank plate 7 by screws 8. Journaled between these two plates is a wire lever 9, having a cam arm or wiper 10, engaging with cam 4. At the upper end of this lever there is attached on the pin 11 a flexible, fine wire 12. The upper end of this lever and its wire are contained within a housing 13 carried by the tank plate 7. Projecting from this housing is a threaded collar designated 14. This collar has a restricted passageway 15 therein for impeding the escape of liquid from a tank 7ª into the tube.

The wire itself is encased within a relatively close fitting, flexible guide casing 16, which is in turn protected by a heavier casing 17. The heavier casing 17 carries an internally threaded collar 18 for attaching it to the threaded collar 14, thus linking the protecting housings to the tank unit.

This flexible wire is movable within the casings 17 and 16 to the point hereafter described. The flexible, protecting casing 17 is attached by a collar 19 to the distant end portion of the closely fitting guide casing 16 at a point within a short distance of the extreme end of the casing 16.

The extreme end of the guide casing 16 carries a head 20, which projects within an enlarged tubular housing or connecting guide tube 21. This housing is threaded at one end at 22, upon which end is mounted an internally threaded collar 23, which has one end slotted longitudinally to form fingers 24, which are externally threaded and which carry a locking nut 25, by which the fingers are clamped upon the guide casing 16. An internally formed shoulder 26 on this connecting and clamping member prevents the removal of the connecting guide tube 21 from the guide casing 16 due to the engagement of the shoulder 26 with the head 20. This arrangement limits the outward movement of the housing or coupling 21, while when the parts are loosened on the guide casing 16, the member 19 limits the backward movement of the tube 21 over the guide casing 16. The outer end 27 of the connecting guide tube 21 is internally threaded as at 28 for connection with the externally threaded tubular member 29 carried by the indicator casing 30. This indicator casing 30 is provided with a front panel 31, which is cut away at 32 to expose the numerals 33 on the drum 34.

Thus, when the person who is installing the outfit on an automobile desires to connect the indicator unit on the dashboard with the actuating wire, the connecting guide tube 21 is loosened on the guide casing 16 and slipped back, so that the wire is exposed. Whereupon the wire is connected to the indicator drum by any well-known means, such as a link secured to the drum and having a hook on its other end to receive a loop at the end of the wire, and then the tube 21 is connected through the head 27 to the indicator casing.

The guide casing 16 is clamped to the tube 21 by the fingers 24, which are controlled by the nut 25. It will be observed that the portion of the wire which is allowed to project is shorter than the length of the enlarged tube 21, so that any kinks or bends in it will always be in that portion of it which travels in the large tube 21, so that no matter what the operator does to the wire in the haste of assembly, the gauge may be still made to function accurately, as it may be readily adjusted to zero with the tank float on the bottom of the tank by adjusting the relation of the tube 21 and casing 16 through the parts 23, 24 and 25.

We do not desire to confine ourselves to the details of construction, but comprehend within our claims such modifications as may be found necessary to adapt our invention to varying conditions.

Having thus fully described the invention, what is claimed and is desired to be secured by Letters Patent, is:

1. In a gasoline gauge, means in a tank adapted to be moved by any change in the level of the liquid therein, remote means for indicating the quantity of the liquid in said tank, and flexible communicating means connecting the two means to one another for synchronous operation, means to house said communicating means at one end, said housing means being of sufficient size whereby, if a projecting end portion of the communicating means becomes looped, bent or twisted, it may still freely move within said housing means, and a guiding means surrounding a portion of the length of said communicating means, relatively closely fitting thereto and movably telescoping within said housing means when the indicating means is being adjusted to zero position.

2. In a gasoline gauge, means in a tank adapetd to be moved by any change in the level of the liquid therein, remote means for indicating the quantity of the liquid in said tank, and flexible communicating means connecting the two means to one another for synchronous operation, means to house said communicating means at one end, said housing means being of sufficient size whereby, if a projecting end portion of the communicating means becomes looped, bent or twisted, it may still freely move within said housing means, a guiding means surrounding a portion of the length of said communicating means, relatively closely fitting thereto and movably telescoping within said housing means, and means to prevent said housing means from moving onto said guiding means to an extent greater than the length of the portion of the communicating means, which normally operates only within said housing means.

3. In a gasoline gauge, means in a tank adapted to be moved by any change in the level of the liquid therein, remote means for indicating the quantity of the liquid in said tank, and flexible communicating means connecting the two means to one another for synchronous operation, means to house said communicating means at one end, said housing means being of sufficient size whereby, if a projecting end portion of the communicating means becomes looped, bent or twisted, it may still freely move within said housing means, a guiding means surrounding a portion of the length of said communicating means, relatively closely fitting thereto loosely telescoping within said housing means, means to prevent said housing means from moving onto said guiding means to an extent greater than the length of the portion of the communicating means, which normally operates only within said housing means, and means to limit the outward movement of the housing means on the guiding means.

4. In a gasoline gauge, means in a tank adapted to be moved by any change in the level of the liquid therein, remote means for indicating the quantity of the liquid in said tank, and flexible communicating means connecting the two means to one another for synchronous operation, means to house said communicating means at one end, said housing means being of sufficient size whereby, if a projecting end portion of the communicating means becomes looped or bent, it may still freely move within said housing means, a guiding means surrounding a portion of the length of said communicating means, relatively closely fitting thereto loosely telescoping within said housing means, means to prevent said housing means from telescoping and guiding means to an extent greater than that portion of the length of said communicating means, which may be exposed for the purpose of making connection with said indicating means, means to limit the relative movement of the housing means and the guiding means with respect to one another, and means to fix said housing means and guiding means with respect to one another at will.

5. In a gauge equipment, an actuating tank unit, a flexible communicating means connected thereto, and an indicator head attached to said connecting means, a guide casing for said communicating means surrounding it a portion of its length, and a connecting guide tube telescopically engaging and adapted to move freely with respect to said guide casing, and cooperating means on said guide tube and guide casing respectively, for preventing the two from becoming detached.

6. In a gauge equipment, an actuating tank unit, a flexible communicating means connected thereto, and an indicator head attached to said connecting means, a guide casing for said communicating means surrounding it a portion of its length, and a connecting guide tube telescopically engaging and adapted to move freely with respect to said guide casing, and cooperating means on said guide tube and guide casing respectively, for preventing the two from becoming detached, and means to limit the movement of said guide tube to prevent the exposure, when detached from the indicator, of the communicating means to an extent greater than the length of the portion of the communicating means which operates only within the connecting guide tube.

7. In a gauge equipment, a tank unit, a guide casing, a flexible communicating means within said guide casing, and attached to said tank unit, a connecting guide tube in which the guide casing is telescopically engaged, a stop formed on said guide casing, means in said connecting guide tube for engaging with said stop to limit the relative movement of the tube and casing, an indicator head adapted to be attached to said guide tube and said communicating means.

8. In a gauge equipment, a tank unit, a guide casing, a flexible communicating means within said guide casing and attached to said tank unit, a connecting guide tube in which said guide casing is telescopically engaged, a stop formed on said guide casing, means in said connecting guide tube for engaging with said stop to limit the relative movement of the tube and casing, an indicator head adapted to be attached to said guide tube and said communicating means, and means to fix at will the relationship of the guide tube to the guide casing at any point within the limits fixed by the stop.

9. In a gauge equipment, a tank unit, an indicator, a flexible casing connected with said tank unit, a communicating wire therein, connecting said tank unit with said indicator, a relatively large tube mounted on said casing and, when out of clamping connection therewith, adapted to move relatively thereto, means to prevent the detachment of the tube from the casing, consisting of a clamping member on the tube having an internal shoulder and a head on the casing engaging with said shoulder, and means to limit the backward movement of the tube on the casing, so as to expose only a portion of the wire beyond the casing and tube, said portion of the wire being the portion which travels within the tube, and means to connect said tube with said indicator.

10. In a gauge equipment, a tank unit, an indicator, a flexible casing connected with said tank unit, a communicating wire therein connecting said tank unit with said indicator, a relatively large tube mounted on said casing and, when out of clamping connection therewith, adapted to move relatively thereto, means to prevent the detachment of the tube from the casing, consisting of a clamping member on the tube having an internal shoulder and a head on the casing engaging with said shoulder, and means to limit the backward movement of the tube on the casing, so as to expose only a portion of the wire beyond the casing and tube, said portion of the wire being the portion which travels within the tube, and means to connect said tube with said indicator, said clamping member consisting of an internally threaded collar, said collar being threaded on the tube and having externally threaded fingers and a clamping nut carried by said fingers, said fingers being adapted to clamp said casing when operated on by said nut.

11. In a gauge equipment, a tank unit, a communicating wire connected at one end to a movable member of said tank unit and adapted to be actuated thereby according to the amount of liquid in the tank, a relatively closely fitting guide casing connected at one end to said tank unit and surrounding the communicating wire, a head at the free end of said guide casing, said wire being adapted to project beyond said guide casing, a protecting casing surrounding said guide casing to a point near the free end of the guide casing, a collar for connecting said protecting casing to the guide casing and adapted to form an abutment, a connecting guide tube slidably mounted on the free end of the guide casing, which does not have the protecting casing, a clamping member adapted to clamp said guide casing and connecting guide tube to one another, said clamping member having an internal shoulder to engage with the head on the guide casing to prevent disconnection of the connecting guide tube and said guide casing, said collar abutment limiting the telescoping movement of said connecting guide tube, an internally threaded head on said guide tube, an indicator casing connected to said head, and indicating means in said casing adapted to be connected with said wire.

In testimony whereof, we affix our signatures.

FRANK A. GROVES.
JOHN FREDERICK GROVES.